United States Patent [19]

Ingeström

[11] 4,425,906
[45] Jan. 17, 1984

[54] SOLAR HEATING SYSTEM IN A BUILDING

[76] Inventor: Curt H. Ingeström, Fornminnesvägen 5, S-446 00 Älvängen, Sweden

[21] Appl. No.: 324,396
[22] PCT Filed: Mar. 18, 1981
[86] PCT No.: PCT/SE81/00089
  § 371 Date: Nov. 18, 1981
  § 102(e) Date: Nov. 18, 1981
[87] PCT Pub. No.: WO81/02775
  PCT Pub. Date: Oct. 1, 1981

[30] Foreign Application Priority Data

Mar. 18, 1980 [SE] Sweden .................... 80021066
Jun. 16, 1980 [SE] Sweden .................... 80044514

[51] Int. Cl.³ ............... F24J 3/02; A63C 19/10; F25B 29/00
[52] U.S. Cl. ............... 126/427; 62/235.1; 62/324.1; 126/431; 165/29
[58] Field of Search ............ 126/427, 431; 165/29; 62/235.1, 324.1, 324.3, 324.6, 325

[56] References Cited

U.S. PATENT DOCUMENTS

| | | | |
|---|---|---|---|
| 2,559,869 | 7/1951 | Gay | 126/431 |
| 2,584,573 | 2/1952 | Gay | 62/235.1 |
| 4,127,873 | 12/1978 | Kachadorian | 126/431 |
| 4,190,199 | 2/1980 | Cawley et al. | 165/29 |
| 4,194,368 | 3/1980 | Bahel et al. | 62/324.1 |
| 4,240,404 | 12/1980 | Franchina | 126/427 |
| 4,291,833 | 9/1981 | Franchina | 126/427 |
| 4,303,058 | 12/1981 | Chun | 126/431 |
| 4,308,042 | 12/1981 | Ecker | 165/235.1 |
| 4,336,692 | 6/1982 | Ecker et al. | 165/29 |
| 4,339,930 | 7/1982 | Kirts | 62/235.1 |

Primary Examiner—Daniel J. O'Connor
Attorney, Agent, or Firm—Cushman, Darby & Cushman

[57] ABSTRACT

Solar heating system in a building with a sun collector and a heat accumulating reservoir comprising a first circuit for circulating air in a closed system through the sun collector and the reservoir which is insulated against the surroundings with the insulation dimensioned for directing the heat supply from the reservoir upwards into the spaces of the building, and a second circuit with a heat pump comprising an evaporator and a condensor for the supply of air from the outside to the spaces of the building in heat exchange relationship with the condensor to heat the air supply to the spaces, of the building in heat exchange relationship with the evaporator.

5 Claims, 3 Drawing Figures

SOLAR HEATING SYSTEM IN A BUILDING

The invention relates to a solar heating system in a building with a heat reservoir, and the purpose thereof is to make possible a more effective use of the heat stored in the reservoir, and an extensive reduction of the energy that has to be supplied externally in order to satisfy the total energy requirement in the building and thus to increase the efficiency of the solar heating system, which is done by making use of the heat which in the present energy supply systems is allowed to escape to the surroundings.

This purpose is achieved by a solar heating system according to claim 1.

Figure 1:
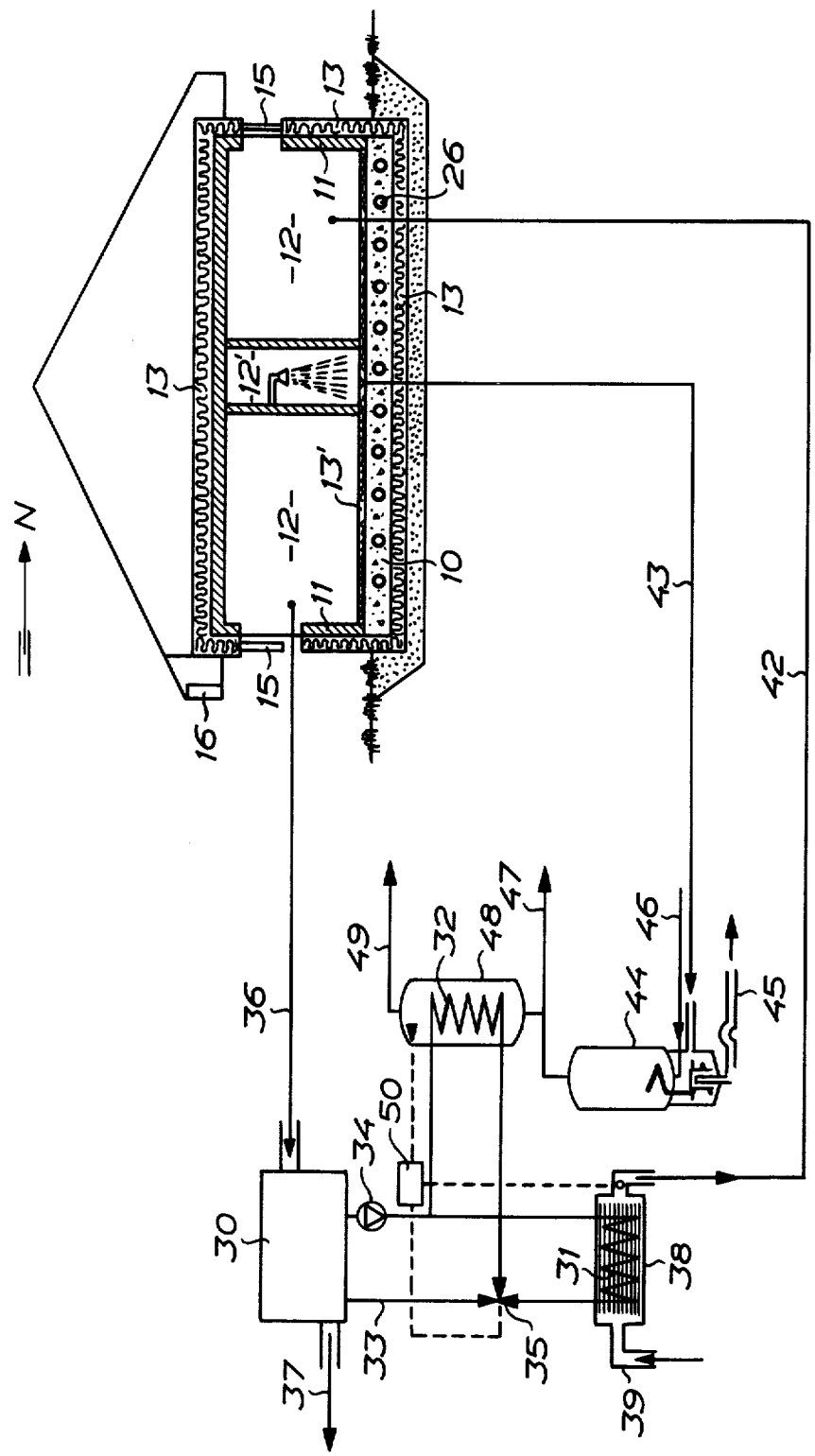
Figure 2:
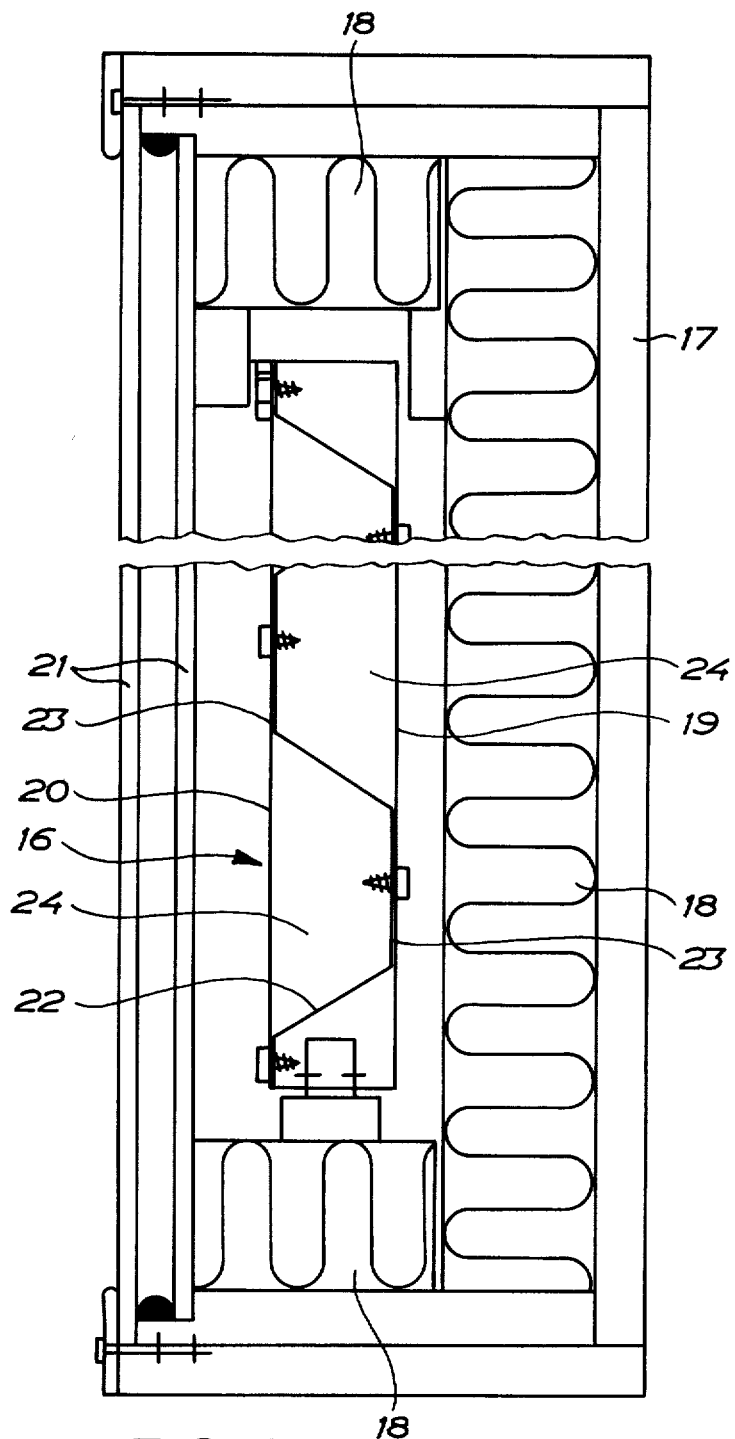
Figure 3:
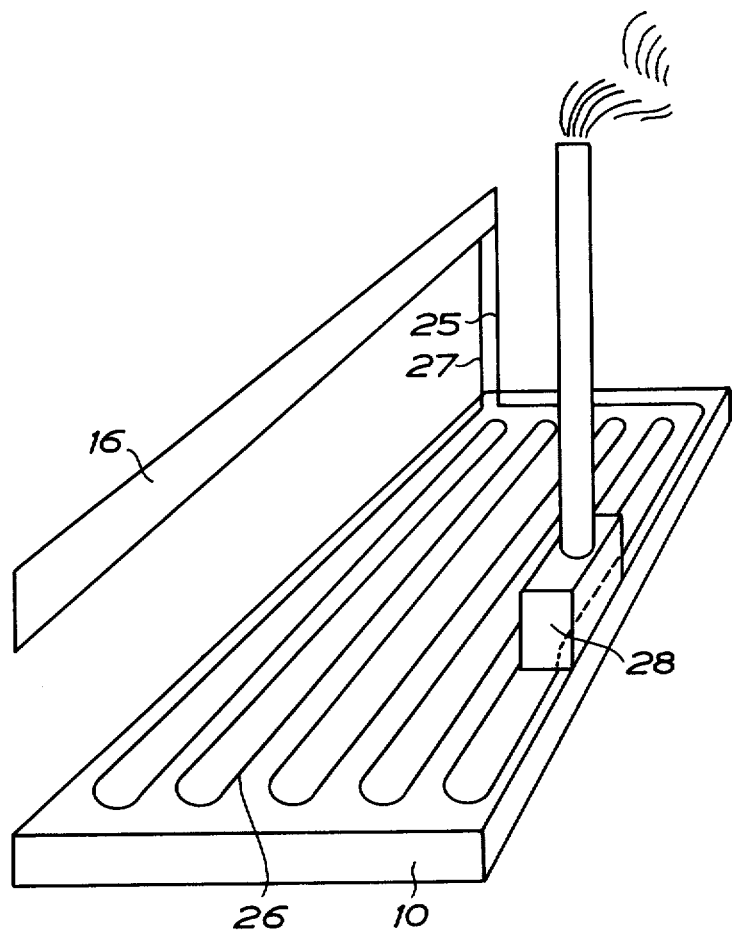

An embodiment of the invention will be described in more detail below with reference to the accompanying drawings, in which FIG. 1 is a vertical sectional view of a building provided with the solar heating system according to the invention, FIG. 2 is a cross-sectional view of a sun collector of the solar heating system, and FIG. 3 is a diagrammatic perspective view of the heat-storing bottom slab of the building with heating sources connected therewith.

The building disclosed in FIG. 1 with the solar heating system according to the invention comprises a supporting bottom slab 10 of concrete on which the supporting walls 11 of the building are builded up. The spaces 12 in the building are well heat-insulated. In the drawings a heavy outer insulation 13 along the floor, the side walls and the roof is shown. Existing windows 15 are provided with sealed panes. The building is orientated in such a way that is has a facade towards the south which is uncovered from the roof to the bottom slab.

The bottom slab 10 is heavier than required considering the strength thereof, to form a heat reservoir for storing heat in a manner to be described, and on the upper side thereof the bottom slab is covered by an insulation 13' which is thinner than the insulation 13.

At the southern side of the building and possibly also along one or more of the other sides of the building a sun collector 16 is arranged along the eaves. Referring also to FIG. 2 the sun collector is mounted in a box 17 with a heat insulation 18 above, below and behind the sun collector. This comprises a back plate 19 and a front plate 20 which has a heat-absorbing paint or coating on the front side thereof. The front plate 20 is covered by double glass or plastic sheets 21. Between the plates 19 and 20 a trapezoidally corrugated plate 22 is provided which is connected to the back plate 19 and the front plate 20 at joints 23 where a seal is provided between the plates 19, 20 and 20, 22, respectively, by means of a sealing compound which has a good thermal conductivity. Thus, the plates 19, 20 and 22 form a number of passages 24 which extend horizontally and are connected to an air inlet at one end and to an air outlet at the other end such that air can circulate through the passages.

Referring to FIG. 3 there is connected to the outlet of the sun collector a conduit 25 which extends to one end of a conduit system or conduit loop 26 in the bottom slab 10, while an inlet conduit 27 is connected to the inlet of the sun collector and extends to the other end of the conduit system or conduit loop 26 as is shown diagrammatically in FIG. 3.

Sun radiation falling in will heat the air in the passages 24 of the sun collector 16, and the heated air is supplied to the reservoir 10 where it supplies heat to the concrete and then returns to the sun collector. The circulation of the air is effected by means of a fan. The air is thus circulated in a closed system through the sun collector and the heat reservoir; no proportion of the air passing through the sun collector is supplied to the spaces 12 and no air is taken from these spaces to the circulation system through the sun collector and the bottom slab.

The heating of the circulating air can be supplemented with heating by means of another heat source, e.g. electric heaters or a furnace which is fired with wood or fossil fuels. This is shown in FIG. 3 wherein a fire stove 28 is provided. The air circulated through the conduit system or conduit loop 26 can be passed through a pipe system in the fire stove to be heated by radiation and/or convection from the fire place and the fumes, respectively, suitable valve or damper arrangements possibly being provided to direct the air either through the sun collector 16 or through the fire stove 26.

The insulation 13' is dimensioned in relation to the heat insulation 13 in such a way that the heat losses are directed form the heat reservoir 10 upwards into the spaces 12 of the building said heat losses being utilized in said spaces. Accordingly, the heat losses actually will be no real losses.

In the embodiment shown heated air from the outside is supplied to the spaces 12, and for this purpose a heat pump is provided which is diagrammatically shown in FIG. 1.

The heat pump comprises an evaporator 30 and two condensors 31 and 32 connected in parallel, refrigerant being circulated through the evaporator 30 and the condensors 31 and 32 in a conduit system 33 by means of a pump 34 in the manner which is conventional in heat pumps. By means of a three-way valve 35 the circulating refrigerant is divided to the two condensors 31 and 32.

Through a conduit 36 air is supplied from the spaces 12 of the building to the evaporator 30 wherein the refrigerant takes up heat from the hot air in the spaces the air then returning from the evaporator 30 at a lower temperature as indicated by an arrow 37. This colder air can be discharged to the surroundings but preferably it can also be supplied to such spaces in the building or separate buildings associated therewith, which contain spaces that are to be kept at low temperature such as food stores, garage, etc.

The condensor 31 is arranged in a heat exchanger 38 to which air is supplied from the outside through an air intake 39. When the air from the outside has passed through the heat exchanger 38 and has been heated therein it is supplied through a conduit 42 to the spaces 12 of the building.

However, the heated air from the outside shall also be supplied in a proper amount and at a proper temperature to different machines and devices in the building wherein heating has to take place temporarily, particularly for drying. Thus, the heated air from the outside can be supplied to a shower cabin as a hot air stream passing rapidly through the cabin for drying after a shower without using a towel. The heated air from the outside can also be passed through a tumbler drier, whereby the laundry is dried by means of heated fresh air in the same manner as when the laundry is dried outside. The air from the tumbler drier can be passed directly to the evaporator 30 of the heat pump. This arrangement avoids not only the electric heaters usually provided in tumbler driers for heating the drying air but also the discharge of air with fibres entrained therein, into the spaces of the building. The same arrangement can, of course, be applied to drying cabinets. Finally, the heated air from the outside can be supplied to a dish-washing machine for drying the dishes, which at present usually is performed by using high power electric heaters switched on temporarily at the end of the dish-washing. Heated air can be discharged from the building by automatic control in such a way that the discharge, when food is being prepared takes place via a kitchen fan only through the conduit 36 and the evaporator 30 so that the discharge of heated air to the surroundings, when the kitchen fan is being used, is avoided and accordingly also the great heat losses associated with such discharge.

Soil water leaving the building e.g. from a shower room 12' is supplied through a conduit 43 to a heat exchanger 44 and is then allowed to escape through a conduit 45. Also fresh water is supplied to the heat exchanger 44 through a conduit 46 for pre-heating of the fresh water which is then supplied alternatively to a conduit 47 to be used for washing or to a heat exchanger 48 wherein the water is heated by heat exchange with the refrigerant in the condensor 32. From the heat exchanger 48 the heated water is supplied through a conduit 49 to the hot water system of the building. The distribution of the refrigerant to the two heat exchangers 38 and 48 through the three-way valve 35 is performed by means of a control equipment 50 sensing the temperature of the heated air from the outside in the outlet of the heat exchanger 38 and the temperature of the water in the outlet of the heat exchanger 48 and adjusting the valve 35 in dependence thereof.

Calculations have shown that an energy requirement of 15 000 to 20 000 kWh/year in a standard house could be satisfied by applying the method according to the invention at a supplied amount of purchased energy which is of the order of 5,000 to 6,000 kWh/year.

I claim:

1. Solar heating system in a building with a sun collector (16) and a heat reservoir (10), characterized by the combination of a first circuit for air which has been heated in the sun collector (16), comprising a passage system (26) in a bottom slab (10) of concrete arranged as the heat reservoir, which is insulated on the outside and towards the interior of the building with the insulation (13') towards the interior of the building adjusted to control the heat supply from the reservoir upwards into the spaces (12) of the building, and a second circuit with a heat pump, separated from the first circuit and comprising an evaporator (30) and a condensor (31, 32) for the supply of air from the outside to the spaces (12) of the building during heat exchange with the condensor to heat the air supplied to the spaces and discharge air from the spaces of the building in heat exchange relationship with the evaporator (30).

2. Solar heating system according to claim 1, characterized by means for controlled supply of the heated air from the outside to a shower cabin, tumbler drier, dish-washing machine and other machines and devices wherein temporary heating has to take place particularly for drying.

3. Solar heating system according to claim 1 or 2, characterized in that an electric heating source or a heating source (28) for burning wood or fossil fuels is connected to the passage system (26) in the bottom slab (10).

4. Solar heating system according to claim 3 characterized in that a conduit (46) for cold water is connected in heat exchange relationship with the condensor (32) for supplying hot water to the taps of the building.

5. Solar heating system according to claim 1 or 2, characterized in that a conduit (46) for cold water is connected in heat exchange relationship with the condensor (32) for supplying hot water to the taps of the building.

* * * * *